April 20, 1937.  C. A. NERACHER  2,077,578
TRANSMISSION MECHANISM
Filed Dec. 6, 1934   2 Sheets—Sheet 1
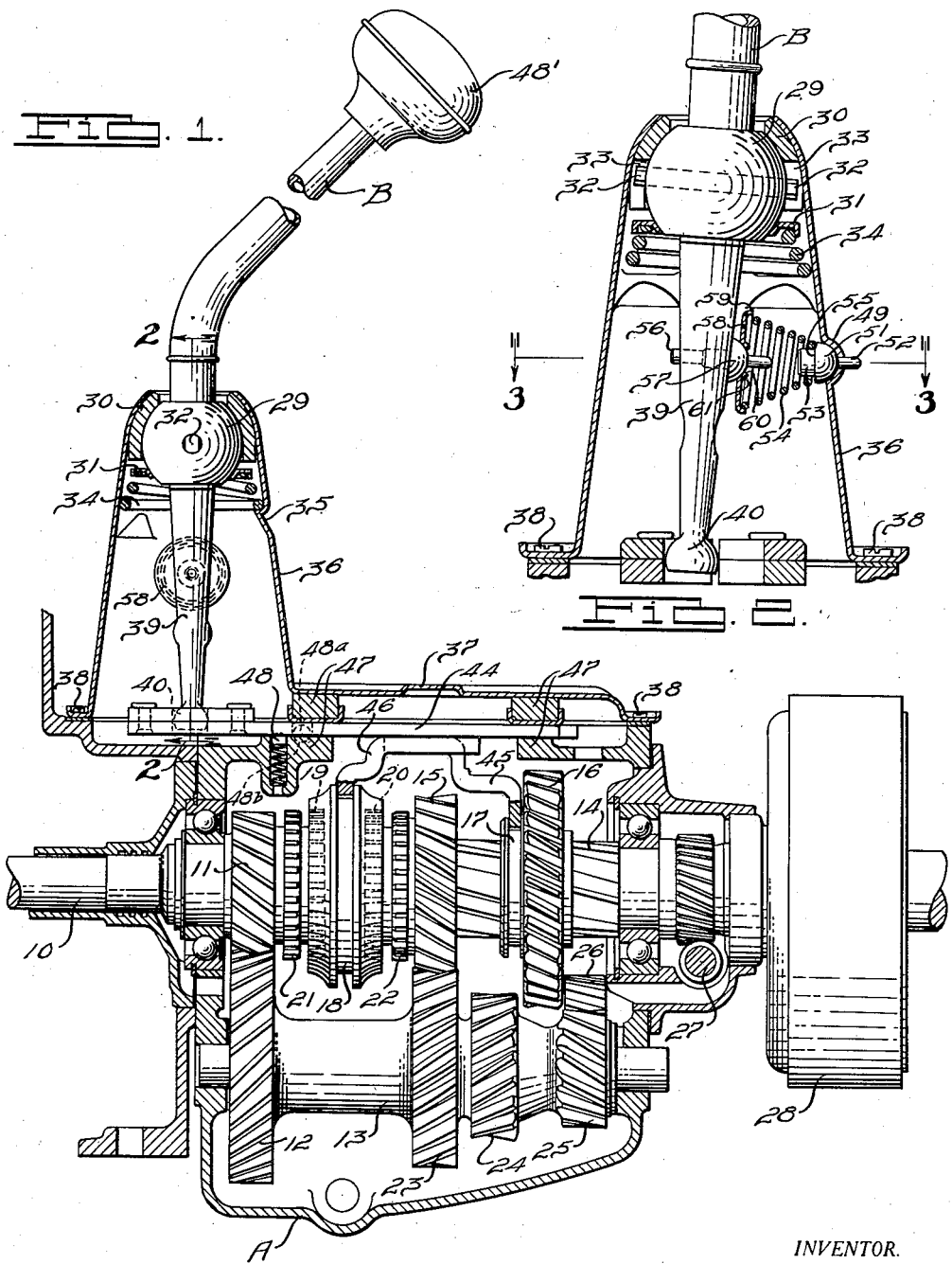
INVENTOR.
Carl A. Neracher.
BY
Harness, Lind, Patee & Harris
ATTORNEYS.

April 20, 1937.      C. A. NERACHER      2,077,578
TRANSMISSION MECHANISM
Filed Dec. 6, 1934      2 Sheets-Sheet 2

INVENTOR.
Carl A. Neracher.
BY
Harness, Lind, Patee & Harris
ATTORNEYS.

Patented Apr. 20, 1937

2,077,578

UNITED STATES PATENT OFFICE 2,077,578

TRANSMISSION MECHANISM

Carl A. Neracher, Detroit, Mich., assignor to Chrysler Corporation, Detroit, Mich., a corporation of Delaware Application December 6, 1934, Serial No. 756,194

10 Claims. (Cl. 74—473)

This invention relates to gear shifting mechanisms of the type used in motor vehicle power transmissions for controlling the speed ratio between the driving and driven shafts.

One object of my invention is to facilitate the manual shifting operations incident to changing the gear ratios whereby the mechanism is safeguarded from unintentional gear ratio selections.

A further object is to provide means for yieldingly urging the selected gears into mesh whereby the gear shifting is facilitated and the parts of the shift mechanism held in selected positions against accidental release of the driving parts such as heretofore occurs when whipping of the gear shift lever results from travel of the vehicle over rough roads.

More particularly my invention is especially applicable to transmissions of the well-known type having a gear shift lever movable laterally and longitudinally with the well known H-type of movement; for example, in selectively moving the transmission shift rails to effect changes in the gear trains of the transmission. While it will be understood that the broader aspects of my invention are not limited in its application to the aforesaid well-known arrangement of shiftable gear transmission, such arrangement is preferred in explaining the principles of my invention and is accordingly illustrated in my accompanying drawings.

Thus, in the aforesaid type of transmission, I have provided means preferably of a yielding nature to urge the gear shift lever toward one side of its H movement, preferably toward and in operating connection with the second and third speed gear shifter rail. With such arrangement, when the driver is shifting from first to second speed, the lever automatically moves through the neutral or cross-over gate and therefore, in effect, provides a straight forward movement without requiring the driver to find the cross-over position as is now required with customary transmissions. Not only will such yielding means prevent rattle of the gear shift lever and parts connected thereto but accidental movement of the shift lever into reverse with resulting protection of the transmission is also brought about, the reverse position being ordinarily longitudinally aligned with the first speed position. The shift from second to high or direct is also facilitated as will be presently apparent.

A further object of my invention is to provide relatively simple and inexpensive means for accomplishing the aforesaid objects, without requiring the use of complicated latches or other mechanism to safeguard the transmission mechanism and facilitate operation thereof.

Further objects and advantages of my invention will be more apparent as this specification progresses, reference being had to the accompanying drawings illustrative of one embodiment of my invention and in which:—

Fig. 1 is sectional side elevational view through the transmission and shift mechanism therefor.

Fig. 2 is an enlarged sectional view along the line 2—2 of Fig. 1 showing the operating end portion of the shift lever.

Figure 3:
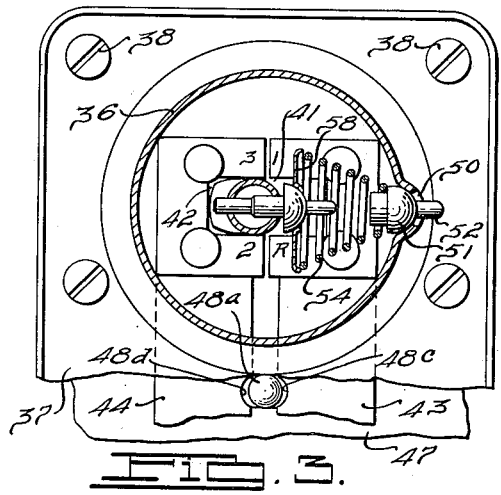
Fig. 3 is a sectional plan view along the line 3—3 of Fig. 2 showing the shift lever in its neutral position.

In the drawings, reference character A represents the transmission of any suitable type selectively operated by gear shift lever B.

Transmission A includes the usual driving shaft 10, having a gear 11 meshing with gear 12 on countershaft 13. The driven shaft 14 has a fixed gear 15, a slidable gear 16 splined thereon and provided with a shift collar 17, and the slidable splined clutch member 18 having the usual internal teeth 19 and 20 adapted to selectively clutch with teeth 21 and 22 carried by gears 11 and 15 respectively. Meshing with gear 15 is a countershaft gear 23, the countershaft being further provided with gears 24 and 25.

First speed or low gear is obtained by sliding gear 16 into mesh with gear 24; second speed is effected by shifting clutch 18 to engage teeth 20 and 22; and direct or high is obtained by shifting clutch 18 to engage teeth 19 and 21. Reverse is effected by shifting gear 16 into mesh with a reverse gear 26, the latter being in constant mesh with gear 25. The driven shaft 14 may have the usual speedometer drive 27 and propeller shaft brake generally indicated at 28, it being understood that the drive passes rearwardly of the transmission to drive the rear wheels (not shown) of the motor vehicle for a rear wheel drive type of automobile.

For controlling the selective movements of clutch 18 and collar 17 of gear 16, the shift lever B has an intermediate ball portion 29 supported between upper and lower socket portions 30 and 31, a pin 32 extending through ball 29 and having its ends projecting therefrom for guided movement in the vertical slots 33 of socket portion 30. The ball 29 and lever B is thus capable of longitudinal or forward and rearward movements pivoting about pin 32, and lateral movements within the socket portions 30 and 31, the pin ends 32 sliding in slots 33. Preferably, the socket portion 31 is yieldingly urged upwardly by a spring 34 seated by an annular series of abutments 35 pressed inwardly from the sheet metal stack 36 which receives the lower end of lever B and supports ball 29, the stack 36 having a transmission cover portion 37 and being suitably removably secured at 38 to the casing of transmission A.

Beneath the pivot at ball 29 the lever B has an operating end portion 39 terminating in the rounded end 40 adapted for selective movement into the spaces 41 and 42 of the shifter rails 43 and 44 respectively. The rail 43 is the shifter for first and reverse is therefore provided with the finger 45 engaging collar 17 while rail 44 is the second and high shifter and has a finger 46 for operating clutch 18. The rails are longitudinally guided for sliding movement between suitable supporting guides 47, one of which may have yielding detents 48 engageable with suitable notches in the shifter rails to assist in properly determining the selective movements or positions of the rails.

It will be apparent that the lever end 40 has an H-like movement, laterally in the neutral space provided by aligned spaces 41 and 42 and longitudinally along each side of the H in selectively moving rails 43 and 44 forwardly and rearwardly.

Simultaneous shifting of both rails 43 and 44 is prevented by an interlocking ball 48ᵃ laterally shiftable in a groove 48ᵇ of a support 47, the ball being laterally aligned with notches 48ᶜ and 48ᵈ of rails 43 and 44 respectively when in their neutral positions. The arrangement is such that either rail may move from neutral by laterally displacing ball 48ᵃ into the notch of the other rail but both rails cannot be simultaneously shifted since the ball cannot be longitudinally displaced from groove 48ᵇ.

For yieldingly urging lever end 40 toward one side of the H, preferably toward rail 44 and into space 42 when in neutral, I have provided the following means, it being noted that lever end 40 moves oppositely about ball pivot 29 from the handle end 48' shown in Fig. 1. The stack or lever support 36 is formed with an outwardly pressed socket 49 having an arcuate slot 50 which extends generally longitudinally or in the direction of sliding of the rails 43 and 44. Movably fitted within socket 49 is the ball portion 51 of a spring abutment formed with an outwardly projecting finger 52 slidably guided by slot 50 and an inwardly extending projection 53 centering the small end of a conical coil spring 54 which seats against the inner flattened shoulder 55. The lever portion 39 has an opening transversely therethrough to receive the stem 56 of a second abutment having a ball portion 57 and projection 58. Movably seated on ball 57 is a stamped disc 58 having a peripheral flange 59 embracing the large end of spring 54, the disc 58 having a central opening 60 through which stem 58 projects. The opening 60 is bounded by the socket 61 forming the seat for disc 58 on the ball portion 57. The spring serves to maintain the abutment assemblies in operative position relative to stock 36 and lever B.

In operation it will be noted that spring 54, which has the desired degree of compression, will exert a lateral thrust on lever portion 39 urging lever end 40 toward and into space 42 of rail 44 when the transmission is in neutral as shown in Figs. 1, 2 and 3. When the operator starts the vehicle in low, the handle 48' is moved to actuate lever end 40 into space 41 and then forwardly (for lever end 40) to actuate rail 43 to engage gear 16 with gear 24. In shifting to second, the operator moves handle 48 forwardly with substantially a straight line impressed movement, the lever portion 39 moving rearwardly. As the lever end 40 is aligned with space 42, spring 54 urged the lever end to move from space 41 into space 42 releasing rail 43 and picking up rail 44 which is then moved rearwardly to effect the second gear ratio drive between teeth 20 and 22. In shifting from second to high, spring 54 maintains the lever end 40 within space 42 against accidental release of rail 44, rail 44 moving forwardly to release teeth 20 and 22 and engage teeth 19 and 21.

As either of the rails 43 or 44 is shifted from the neutral position of Fig. 3 either longitudinally forwardly or rearwardly, spring 54 exerts a longitudinal component of thrust on lever portion 39, the thrust angle increasing as the rail movement progresses. Thus, spring 54 assists in completing each gear selection, assisting in the meshing of the gears and teeth and also prevents accidental release of either shifter rail from its positions of selective control of the transmission gears and clutches. Spring 54 further prevents the lever B from rattling and provides a safety against accidental movement of shifting rail 43 rearwardly for effecting reverse in shifting from first to third or in other instances of gear shift lever movements.

Figure 4:
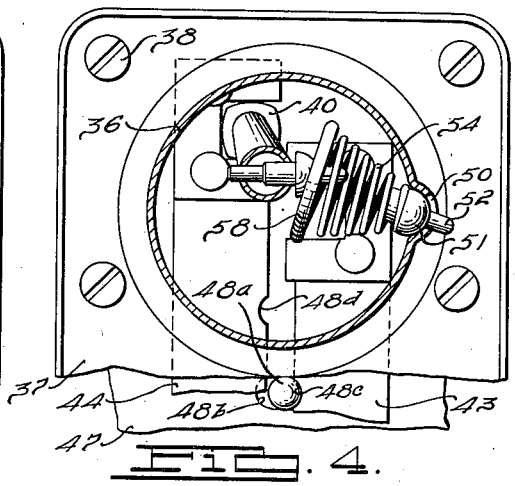
Fig. 4 is a view similar to Fig. 3 but showing the shift lever moved into its direct or high gear ratio position.

When a rail, such as the rail 44, for example, is moved as shown in Fig. 4, the spring abutments readily accommodate the forward swinging movement of the axis of spring 54, the ball portion 51 readily pivoting in socket 49 and the plate 58 readily pivoting at its socket 61 about the ball portion 57.

Figure 5:
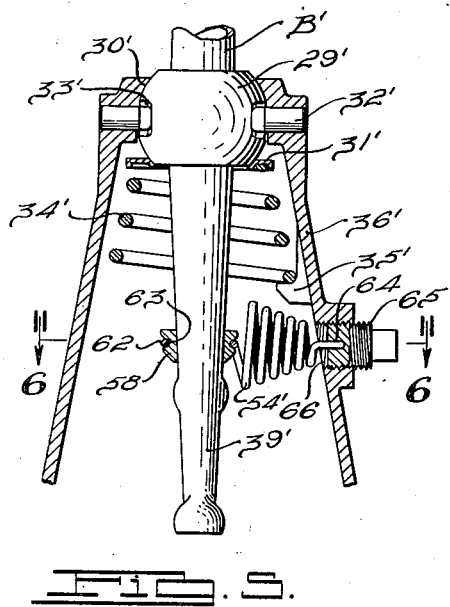
Fig. 5 is a view similar to Fig. 2 but illustrating a modified form of my invention.
Figure 6:
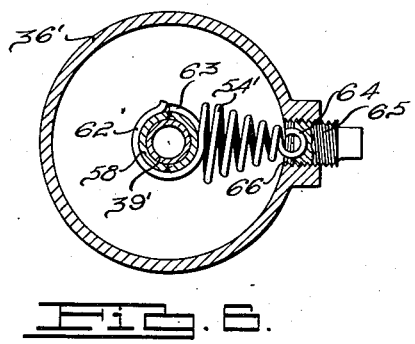
Fig. 6 is a sectional plan view along the line 6—6 of Fig. 5.

In Figs. 5 and 6 I have illustrated a modified form of spring abutments and shifter ball support, the parts being capable for use in the Fig. 1 assembly as will be readily understood. Shift lever B' has its ball portion 29' pivoted by pins 32' in the stack socket portion 30' and the spring pressed lower socket portion 31'. The stack 36' is a casting or forging with integral spring seats 35' for spring 34'. Slots 33' provide for lateral pivoting of lever B' at ball 29'.

The lever portion 39' receives an annular spring abutment 58' which may be split for assembly purposes and then welded in position or held thereon by the annular end 62 of spring 54', said end passing around a groove 63 of the abutment. The outer end of spring 54' has an eye or loop 64 in the plane of end 62, the eye 64 being seated in a suitable recess of an abutment plug 65 threadedly adjustable, upon removing eye 64 therefrom, in the opening 66 of the stack 36'.

In operation, spring 54' operates similar to spring 54, the eye 64 and annular end 62 readily sliding in plug 65 and around groove 63 respectively to permit the spring axis to incline forwardly or rearwardly as in the case of spring 54.

My reference in the specification and claims to lateral and longitudinal or other similarly designated movements of the shift lever B and parts moved thereby is used entirely in a relative sense and in order to conveniently designate the multidirectional movement of the shift lever.

I desire to point out that various modifications and changes will be apparent from the teachings of my invention and I do not limit my invention in its broader aspects to the particular combination and arrangement of parts which I have shown by way of example.

What I claim is:

1. In a variable speed ratio transmission of the manual selection type, a pair of longitudinally movable shifter rails adapted to selectively control the speed ratios, said rails having spaces laterally aligned when positioned for a neutral setting of the transmission, a manually operable shift lever, means for pivotally mounting said lever with an operating end thereof positioned for selective engagement in said spaces whereby said rails may be moved longitudinally relative to each other, and yielding means acting to urge said shift lever laterally into one of said spaces when positioned for neutral, said yielding means being adapted to thrust the shift lever longitudinally in response to selective manual movements of said rails.

2. In a variable speed ratio transmission of the manual selection type, a pair of longitudinally movable shifter rails adapted to selectively control the speed ratios, one of said rails being adapted to control a reverse drive through the transmission, said rails having spaces laterally aligned when positioned for a neutral setting of the transmission, a manually operable shift lever, means for pivotally mounting said lever with an operating end thereof positioned for selective engagement in said spaces whereby said rails may be moved longitudinally relative to each other, and a spring acting to urge the operating end of said shift lever laterally away from said reverse controlling rail and toward the other of said rails for engaging the space thereof when said shift lever is positioned for neutral, said spring being adapted to exert a thrust longitudinally on said rails in response to selective manual movements of said rails.

3. In a variable speed ratio transmission of the manual selection type, a pair of longitudinally movable shifter rails adapted to selectively control the speed ratios, said rails having spaces laterally aligned when positioned for a neutral setting of the transmission, a manually operable shift lever, means for pivotally mounting said lever with an operating end thereof positioned for selective engagement in said spaces whereby said rails may be moved longitudinally relative to each other, a conical spring positioned to thrust said shift lever laterally toward one of said rails, and means for supporting said spring for swinging movement approximately in a plane perpendicular to the axis of the operating end of said lever whereby to exert a longitudinal thrust on said shift lever when the latter is operated to effect a change in the speed ratio.

4. In a variable speed ratio transmission of the manual selection type, a pair of longitudinally movable shifter rails adapted to selectively control the speed ratios, said rails having spaces laterally aligned when positioned for a neutral setting of the transmission, a manually operable shift lever, means for pivotally mounting said lever with an operating end thereof positioned for selective engagement in said spaces whereby said rails may be moved longitudinally relative to each other, a conical spring positioned to thrust said shift lever laterally toward one of said rails when said lever is positioned for neutral, and means for supporting said spring for swinging movement whereby to exert a longitudinal thrust on said shift lever when the latter is operated to effect a change in the speed ratio, said conical spring having its base end extending in the general direction of the axis of said lever end adjacent thereto.

5. In a selective gear transmission, a shift lever, means for pivotally supporting said lever for shifting movements laterally and longitudinally, and yielding means displacing one end of said lever laterally in the neutral position of the lever, said yielding means exerting an increasing longitudinal thrust on said lever end during a shifting movement thereof from said neutral position.

6. In a shifting mechanism of the character described, a shift lever, a structure housing the operating end portion of said lever, means for pivotally supporting said lever intermediate its ends by said housing structure whereby the ends of said lever may be moved in a plurality of reciprocating paths, a coil spring, and means for supporting said spring between said housing and lever to swing the ends of said lever transversely of said paths when positioned for neutral and in the direction of each of said paths when moved as aforesaid.

7. In a shifting mechanism of the character described, a shift lever, a structure housing the operating end portion of said lever, means for pivotally supporting said lever intermediate its ends by said housing structure whereby the ends of said lever may be moved in a plurality of reciprocating paths, a coil spring between said housing and lever adapted to thrust one of said lever ends in the direction of each of said paths, and means for pivotally connecting one end of said spring to the last said lever end, said connecting means including a ball portion carried by the lever and a plate receiving said spring end and having a socket portion engaging said ball portion, said spring having its axis approximately intersecting the axis of said operating end portion of the lever between said lever pivoting means and the last said lever end and being disposed at an angle with respect to said lever portion axis when said lever is positioned for neutral setting of the transmission.

8. In a shifting mechanism of the character described, a shift lever, a structure housing the operating end portion of said lever, means for pivotally supporting said lever intermediate its ends by said housing structure whereby the ends of said lever may be moved in a plurality of reciprocating paths, a coil spring between said housing and lever adapted to thrust said lever in the direction of each of said paths, said spring having its axis extending laterally of said lever when positioned for neutral setting of the transmission, and means for pivotally connecting one end of said spring to said lever, said connecting means including a grooved part carried by the shift lever, said spring end being looped about said lever in said groove.

9. In a shifting mechanism of the character described, a shift lever, a structure housing the operating end portion of said lever, means for pivotally supporting said lever intermediate its ends by said housing structure whereby the ends of said lever may be moved from a neutral setting along a plurality of reciprocating paths, a coil spring between said housing and lever adapted when said lever is shifted to thrust said lever ends in the direction of each of said paths and to thrust said lever ends into one of said paths when said lever is shifted to its neutral position, and means for pivotally connecting one end of said spring to said housing structure, said connecting means including an abutment member formed with a ball portion, said housing structure having a socket portion deflected outwardly therefrom to receive said ball portion.

10. In a shifting mechanism of the character described, a shift lever, a structure housing the operating end portion of said lever, means for pivotally supporting said lever intermediate its ends by said housing structure whereby the ends of said lever may be moved in a plurality of reciprocating paths, a coil spring between said housing and lever adapted to thrust said lever in the direction of each of said paths, said spring having its axis extending laterally of said lever when positioned for neutral setting of the transmission, and means for pivotally connecting one end of said spring to said housing structure, said connecting means including a grooved plug carried by said housing structure, said spring end having an eye slidably fitting said groove.

CARL A. NERACHER.